(12) United States Patent  
Young et al.

(10) Patent No.: US 9,310,565 B2  
(45) Date of Patent: Apr. 12, 2016

(54) CLOAKING SYSTEM WITH WAVEGUIDES

(71) Applicant: Intel Corporation, Santa Clara, CA (US)

(72) Inventors: Ian A. Young, Portland, OR (US); Johanna M. Swan, Scottsdale, AZ (US); Robert L. Sankman, Phoenix, AZ (US); Marko Radosavljevic, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 443 days.

(21) Appl. No.: 13/723,651

(22) Filed: Dec. 21, 2012

(65) Prior Publication Data

US 2014/0178003 A1    Jun. 26, 2014

(51) Int. Cl.  
*F41H 3/02* (2006.01)  
*G02B 6/34* (2006.01)

(52) U.S. Cl.  
CPC ... *G02B 6/34* (2013.01); *F41H 3/02* (2013.01)

(58) Field of Classification Search  
CPC ............................................................ F41H 3/02  
See application file for complete search history.

(56) References Cited

U.S. PATENT DOCUMENTS

| 8,253,639 B2 | 8/2012 | Cohen |
| 2002/0090131 A1 | 7/2002 | Alden |
| 2008/0024792 A1 | 1/2008 | Pendry et al. |
| 2009/0231682 A1 | 9/2009 | Kashyap et al. |
| 2010/0110559 A1 | 5/2010 | Cai et al. |
| 2010/0156556 A1 | 6/2010 | Cohen |
| 2011/0188805 A1* | 8/2011 | Fu et al. ........................ 385/37 |

FOREIGN PATENT DOCUMENTS

| CN | 202614973 U | 12/2012 |
| WO | 2014098984 A1 | 6/2014 |

OTHER PUBLICATIONS

International Search Report and Written Opinion received for PCT Application No. PCT/US2013/046602, mailed on Sep. 25, 2013, 11 pages.  
Valentine et al., "An Optical Cloak made of Dielectrics", Nature Materials, vol. 8, Apr. 29, 2009, pp. 568-571.  
Office Action received for Chinese Patent Application No. 201380004614.0, mailed on Apr. 3, 2015, 5 pages of Chinese Office Action only.  
Office Action received for Taiwan Patent Application No. 102143017, mailed on Aug. 20, 2015, 6 pages of English Translation and 4 pages of Taiwan Office Action.  
International Preliminary Report on Patentability and Written Opinion Received for PCT Patent Application No. PCT/US2013/046602, mailed on Jul. 2, 2015, 8 pages.

* cited by examiner

*Primary Examiner* — Jerry Rahll  
(74) *Attorney, Agent, or Firm* — Forefront IP Lawgroup, PLLC

(57) ABSTRACT

Described herein are technologies related to passive or active cloaking devices. More particularly, the passive or active cloaking devices utilize input/output grating couplers and waveguides to create an impression of invisibility on an object that is covered by the passive or active cloaking devices.

17 Claims, 7 Drawing Sheets

CLOAKING SYSTEM WITH WAVEGUIDES

BACKGROUND

There are several methods of concealment. For example, the concealment or camouflaging is achieved by covering an object with a clothing material that contains similar patterns and designs of a surrounding area where the object is located. In this example, the clothing material resembles the environment to avoid visualization of the object to be concealed. However, this type of concealment is unreliable since the surrounding area tends to change at any given time. In other words, when the object is moving from one place to another, this type of concealment is not effective unless it adapts to the dynamic nature of the surrounding area where the object is currently located.

In military and police surveillance, concealment is very important. Concealment of structures that are bulky and with inconsistent shapes can be expensive and hard since the surrounding area may change from time to time. For example, concealment of the structures may include several types of camouflaging if the structures are movable and generally used as a mobile structure.

DETAILED DESCRIPTION

Described herein is a technology for passive or active cloaking devices (i.e., camouflage) that allow an object or person to blend into its surroundings. More particularly, a method of projecting a scene image from one side to opposite side of the passive or active cloaking device is described.

For example, a passive cloaking device is made up of at least one input and at least one output grating coupler that are respectively coupled to both ends of a waveguide. In this example, the scene image from one side of the passive cloaking device directs light rays that are received by the input grating couplers. The received light rays are filtered and directed from the input grating coupler to the output grating coupler through the waveguide. Thereafter, the output grating coupler is configured to provide output light rays to reproduce the scene image that reflected the light rays at the input grating coupler side.

In another example, an active cloaking device suit utilizes a cloaking device integrator to receive the filtered light rays from the input grating coupler. In this example, the cloaking device integrator integrates and stores the filtered light rays to a memory. The stored integrated filtered light rays may actually include an initial image that will be projected at the output grating couplers. For example, the cloaking device integrator is configured to detect current position of the output grating couplers and thereafter determines the output grating couplers to be utilized in projecting the initial image. In this example, the stored integrated filtered light rays are transferred to the determined output grating couplers to provide output light rays. The output light rays may project the initial image that is created by the stored integrated filtered light rays. Consequently, the active cloaking device suit provides invisibility to a user.

Figure 1:
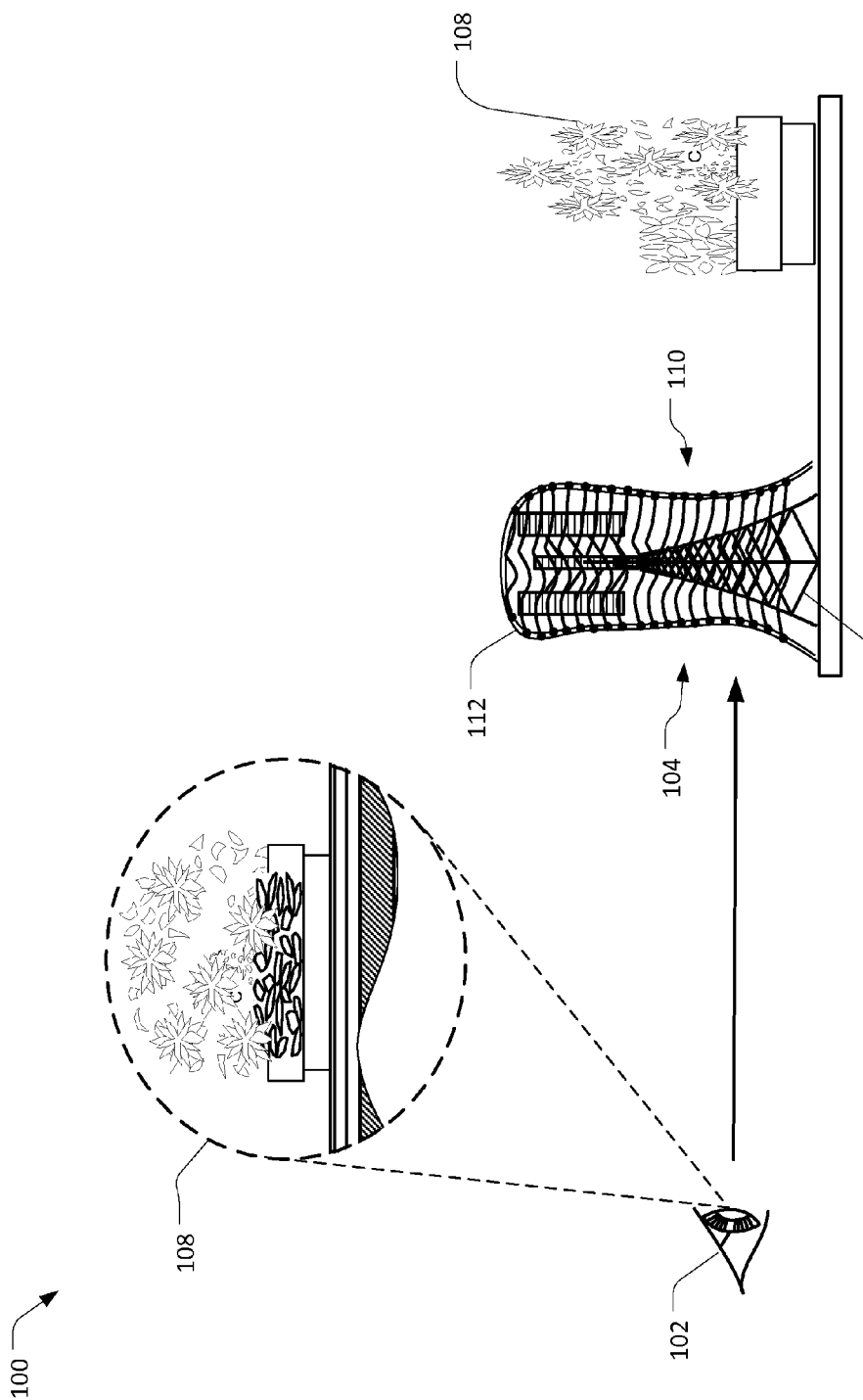
FIG. 1 illustrates an example scenario that shows an example situation of utilizing a cloaking device that is embedded with waveguides.

FIG. 1 illustrates a scenario 100 that shows an example situation of utilizing a cloaking device that is embedded with waveguides. Scenario 100 shows a human eye 102 that is located at left side 104 of an antenna 106, a tree 108 at right side 110 of the antenna 106, and a cloaking device 112.

As an example of present implementation herein, a complete view of the tree 108 is not possible when viewed at the left side 104 of the antenna 106; however, with the cloaking device 112 that blankets the antenna 106, the complete view of the tree 108 is now visible to the human eye 102. In other words, an image of the tree 108 is projected by the cloaking device 112 from the right side 110 to the left side 104 such that, the human eye 102 will be able to view completely the tree 108 rather than the antenna 106. Consequently, the antenna 106 becomes "invisible" to the human eye 102, since the area behind the object (i.e., antenna 106) is projected to the human eye 102 by the cloaking device 112.

As an example of present implementation herein, the cloaking device 112 may be a passive cloaking device that is made up of input/output grating couplers (not shown) that are coupled to both ends of waveguides (not shown) to project the scene image of the tree 108 from right side 110 to the left side 104 of the antenna 106. For example, the input grating couplers may be configured to receive reflected lights (not shown) from the tree 108. In this example, the input grating couplers are coupled to the waveguides that are wrapped around the cloaking device 112 from the right side 110 to the left side 104. In other words, the input grating coupler and the output grating coupler are coaxial with one another with the waveguide located in between them to transfer the received reflected lights. To this end, a field of view for the human eye 102 contains the image of the tree 108 rather than the antenna 106.

In another implementation, the cloaking device 112 is an active device. For example, the input/output couplers and the waveguides are configured to transfer the received reflected lights rays from the right side 110 towards the location of the human eye 102 by amplifying the light rays. In this example, a power source (e.g., batteries) may be utilized to provide amplification of the received reflected lights.

Figure 2:
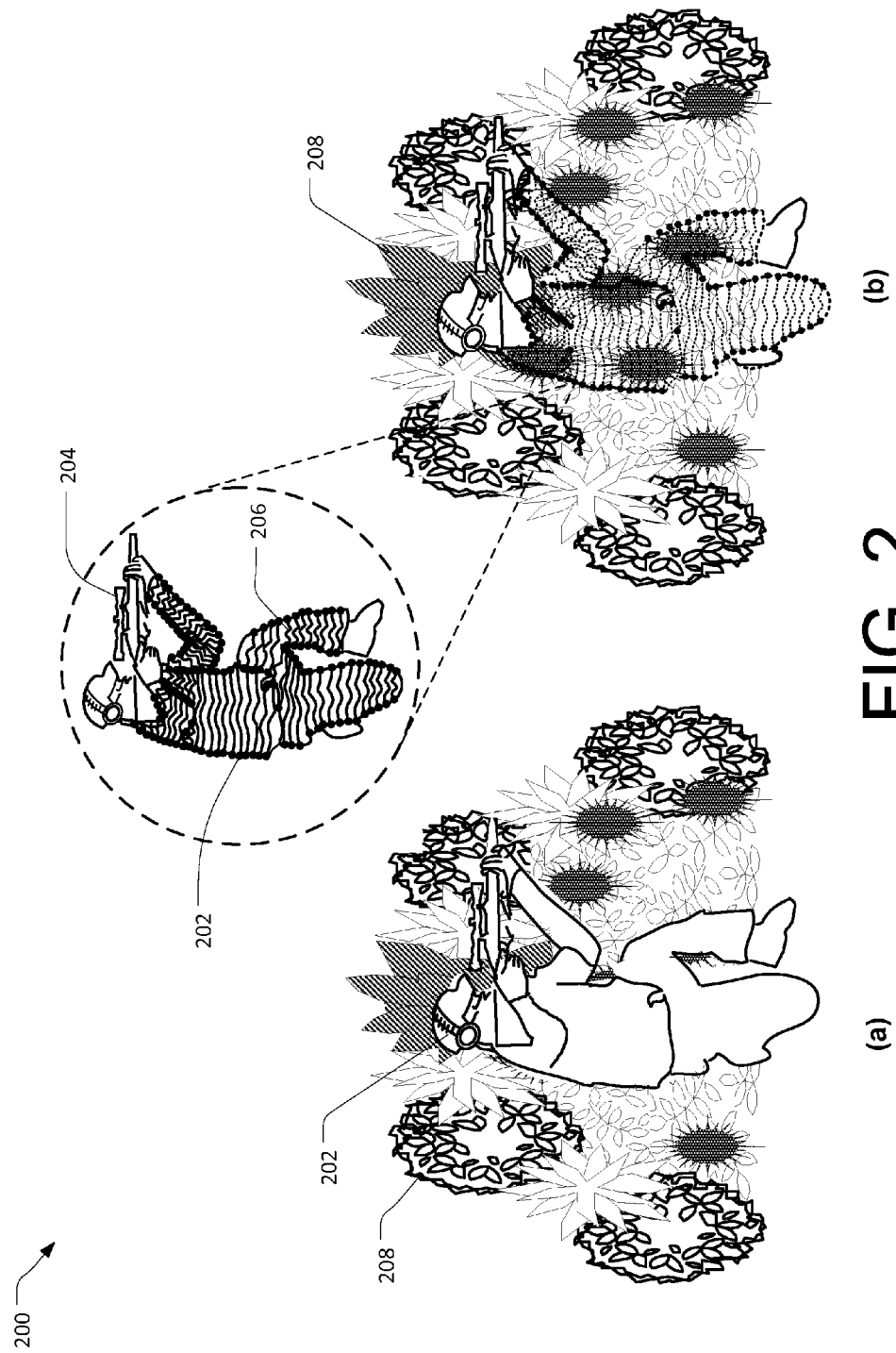
FIG. 2 illustrates an example scenario that shows an example situation of utilizing a cloaking device suit that is embedded with waveguides.

FIG. 2 illustrates a scenario 200 that shows another example situation of utilizing the cloaking device that is embedded with waveguides. Scenario 200 shows a hunter 202 aiming a rifle 204, a cloaking device suit 206, and bushes 208. Furthermore, FIG. 2(a) shows the hunter 202 without the cloaking device suit 206 while FIG. 2(b) shows the hunter 202 wearing the cloaking device suit 206 to appear invisible in the bushes 208.

As an example of present implementation herein, FIG. 2(a) shows the hunter 202 to be completely visible while aiming his rifle 204 behind the bushes 208. On the other hand, when the hunter 202 is wearing the cloaking device suit 206 as shown in FIG. 2(b), the visibility is limited to his head, shoes, palms and fingers, or other parts of his body that were not covered by the cloaking device suit 206.

For example, FIG. 2b shows the hunter 202 in kneeling position while wearing the cloaking device suit 206. In this example, light reflections from the bushes 208 behind the hunter 202 are projected to his front. In other words, rather than seeing the body of the hunter 202, the cloaking device suit 206 projects portions of the bushes 208 to project partial invisibility of the hunter 202. For example, as shown in FIG. 2(b), the visible objects are limited to shoes, head, rifle 204, and hands of the hunter 202. The body parts covered by the cloaking device suit 206 are not visible.

Similar to FIG. 1, the cloaking device suit 206 may be an active or passive cloaking device suit 206. It is to be understood that an article of clothing can be an embodiment of the cloaking device that is described if the fabric of the clothing has the described structure (i.e., waveguides, couplers, etc.) integrated into the clothing/fabric.

Figure 3:
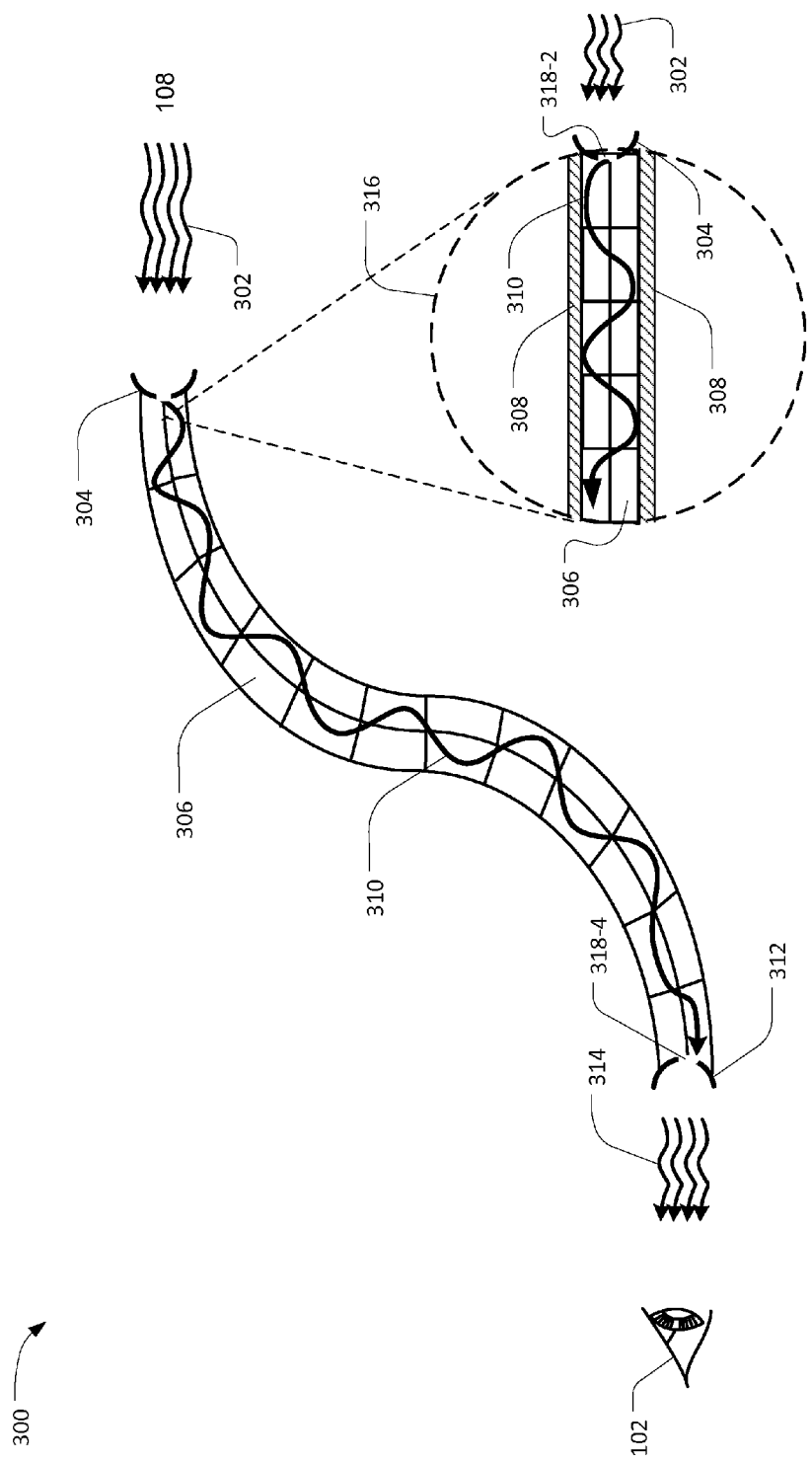
FIG. 3 illustrates an example image projector that shows an example fabric of a cloaking device.

FIG. 3 illustrates an example image projector 300 that shows an example fabric of the cloaking devices in FIGS. 1 and 2. FIG. 3 shows the tree 108 that reflects light rays 302, an input grating coupler 304, waveguide 306, a cladding material 308, filtered light ray 310, output grating coupler 312, output light rays 314, and the human eye 102. Furthermore, FIG. 3 shows a cross-sectional 316 of the image projector 300 to particularly show the cladding material 308 and opening 318-2 of the input grating coupler 304 as opposed to opening 318-4 of the output grating coupler 312.

As an example of present implementation herein, the input grating coupler 304 may contain a wide aperture of about sixty microns to receive the light rays 302 from the tree 108. The light rays 302 are reflections from a portion of the tree 108. For example, the light rays 302 are reflections from a branch of the tree 108. In this example, a multiple set of light rays 302 are reflected from the whole tree and the multiple set of light rays 302 are correspondingly received by waveguides of the cloaking device in FIG. 3.

In an implementation, the received light rays 302 are filtered through the opening 318-2 of the input grating 304. For example, the opening 318-2 of the input grating 304 is configured to provide the filtered light ray 310 that will reflect and be directed through the waveguide 306 due to total internal reflection. In this example, the total internal reflection denotes the filtered light ray 310 to enter and strike a medium boundary at an angle larger than a particular critical angle—with respect to a normal of a surface in the medium boundary—in order to be reflected through the waveguide 306.

As an example of present implementation herein, the filtered light ray 310 initially starts with an incident angle that is configured to create the total internal reflection in the waveguide 306. The total internal reflection creates the reflection throughout the waveguide 306 with minimal losses. For example, the filtered light ray 310 will be reflected continually until it exits the output grating coupler 312. In this example, the opening 318-4 of the output grating coupler 312 is configured to provide the output light rays 314 to project an image of the received light rays 302.

As an example of present implementation herein, the cladding material 308 may contain at least one layer of materials of lower refractive index that is in intimate contact with the waveguide 306 of higher refractive index. The higher refractive index in the waveguide 306 is utilized for the purpose of allowing the filtered light ray 310 to travel with minimal losses through the waveguide 306. For example, the lower refractive index cladding material 308 is configured to cause the filtered light ray 310 to be confined to the waveguide 306 due to total internal reflection at the medium boundary between the cladding material 308 and the waveguide 306. In this example, the waveguide 306 is configured to include a size (e.g., forty by forty microns) that will reflect the filtered light ray 310 from the input grating coupler 304 to the output grating coupler 312.

In an implementation, multiple image projectors 300 are configured to project the image of the whole tree (i.e., tree 108) from one side (e.g., right side 110) of the cloak device 112 to the other side (e.g. left side 104) as shown in FIG. 1.

Figure 4:
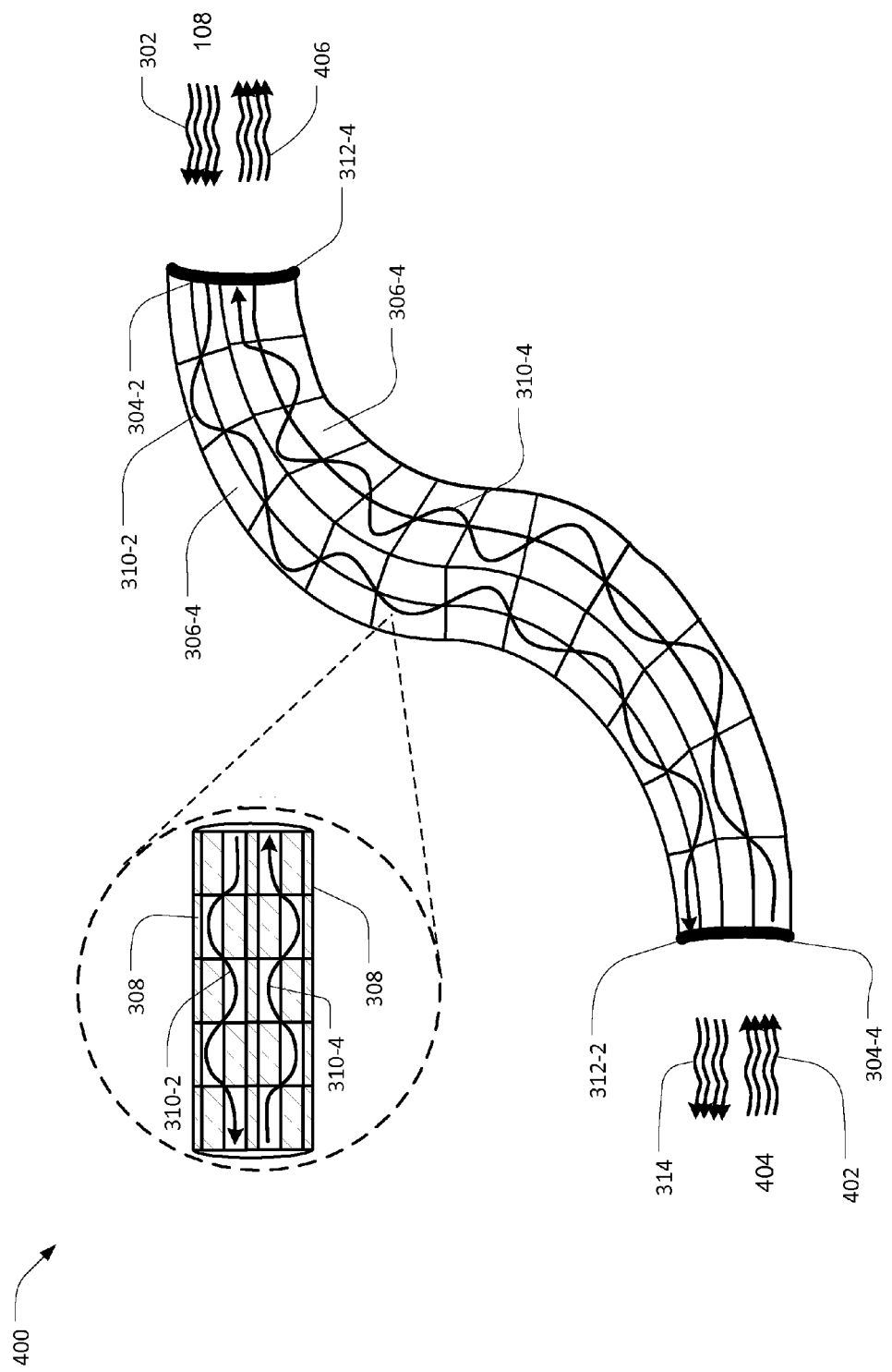
FIG. 4 illustrates an example image projector that shows an example bidirectional fabric of a cloaking device.

FIG. 4 illustrates an image projector 400 that shows an example bidirectional fabric of the cloaking devices in FIGS. 1 and 2. Image projector 400 shows the waveguide 306-4 that projects the light rays 302 from right side to left side, and another waveguide 306-4 that projects light rays 402 from the left side to the right side. However with optic waveguides and grating couplers (which are both passive) light can travel in both directions simultaneously (there is reciprocity). Therefore in certain implementations, bidirectional image routing may be done with one grating coupler on each end of one waveguide and direct images from each side to each other side over the same waveguide.

As an example of present implementations herein, the operations for projecting the received light rays 302 as discussed in FIG. 3 is similarly applied in FIG. 4; however, this operation is applied in two opposite directions for two different set of waveguides 306. For example, adjacent to the output grating coupler 312-2 is a separate input grating coupler 304-4 that receives the light rays 402. In this example, the light rays 402 may include reflected light rays from an object 404 that may be different from the tree 108, which reflects the light rays 302 at the other end. The light rays 402 are received by the input grating coupler 304-4 and filtered to provide the filtered light ray 310-4. Similar to the waveguide 306-2, the waveguide 306-4 is configured to transfer the filtered light ray 310-4 from the input grating coupler 304-4 to the output grating coupler 312-4 due to presence of the total internal reflection. In this case, output light rays 406 may project the object 404 that reflects the light rays 402.

Figure 5:
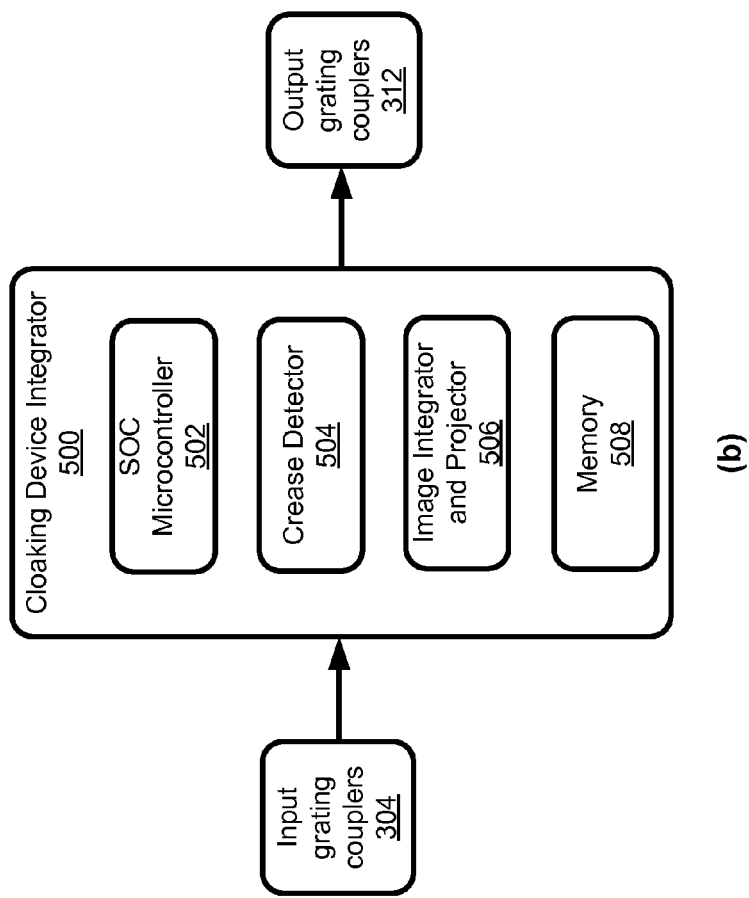
FIGS. 5a and 5b illustrate an example implementation of a cloaking device suit.
Figure 5:
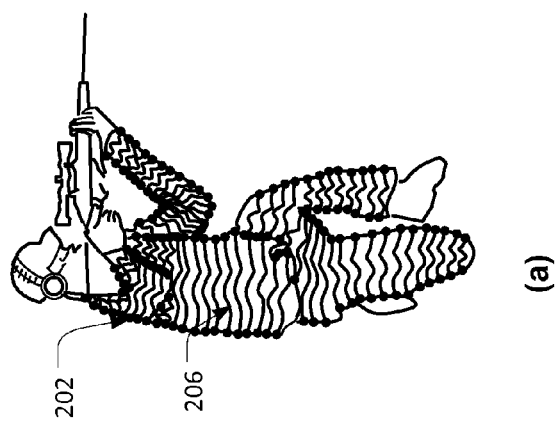

FIGS. 5(a) and 5(b) illustrate an example implementation of cloaking device suit 206. FIG. 5a shows the hunter 202 with the cloaking device suit 206 in a creased formation. For example, when the hunter 202 is in a kneeling position, the cloaking device suit 206 will have creases such as, folds along the knee, hands, and legs of the hunter 202. In other words, the input grating coupler 304 is not concentric with the output grating coupler 312. Consequently, utilizing a passive cloaking device suit 206 may provide an incomplete resemblance of an image (e.g., bushes 208) to provide invisibility of the hunter 202. This is due to the non-concentricity where the output light rays 314 are projected in a different direction that may be out of phase with the other output light rays 314.

As an example of present implementations herein, FIG. 5(b) shows an example implementation of active cloaking device system. For example, a cloaking device integrator 500 is utilized to control projection of images from the input grating couplers 304 to the output grating couplers 312 to create invisibility of the hunter 202 such as, behind the bushes 208 in FIG. 2. In this example, the cloaking device integrator 500 contains a system on chip (SOC) microcontroller 502, a crease detector 504, image projector 506, and memory 508.

In an implementation, the filtered light rays 310 from the input grating couplers 304 are received and integrated by the image integrator and projector 508 to form an initial image of a reflecting object (e.g., bushes 208). In this implementation, the initial image or the filtered light rays 310 are stored in the memory 508. Furthermore, the image integrator and projector 508 is configured to supply to the memory 508 the particular input grating coupler 304 that is a source for the filtered light ray 310.

In an implementation, the SOC microcontroller 502 is configured to control operation of the cloaking device integrator 500. For example, the SOC microcontroller 502 is configured to determine the current crease (i.e., current fold) of the cloaking device suit 206 through the crease detector 504. In this example, the SOC microcontroller 502 may detect bending and twisting of the cloaking device suit 206 through the crease detector 504 and thereafter determines whether the hunter 202 is in the kneeling position, sitting position, or the like. Furthermore, the SOC microcontroller 502 utilizes the crease detector 504 to detect current positions of the output grating couplers 312 in order to determine the output grating couplers 312 to be used in projecting the initial image that is created by the stored integrated filtered light rays 310.

As an example of present implementations herein, the SOC microcontroller 502 is configured to utilize the output grating couplers 312 that may provide resemblance to the stored initial image of the bushes 208. For example, based from the determined current crease of the cloaking device suit 206, the SOC microcontroller 502 is configured to determine which output grating coupler 312 are utilized to project output light rays that resembles the stored initial image of the bushes 208. In this example, the image integrator and projector 506 is configured to transfer the stored integrated filtered light rays 310 to the determined output grating couplers 312.

As an example of present implementations herein, the waveguides 306 are utilized in coupling the input grating couplers 304 and the output grating couplers 312 to the cloaking device integrator 500.

Figure 6:
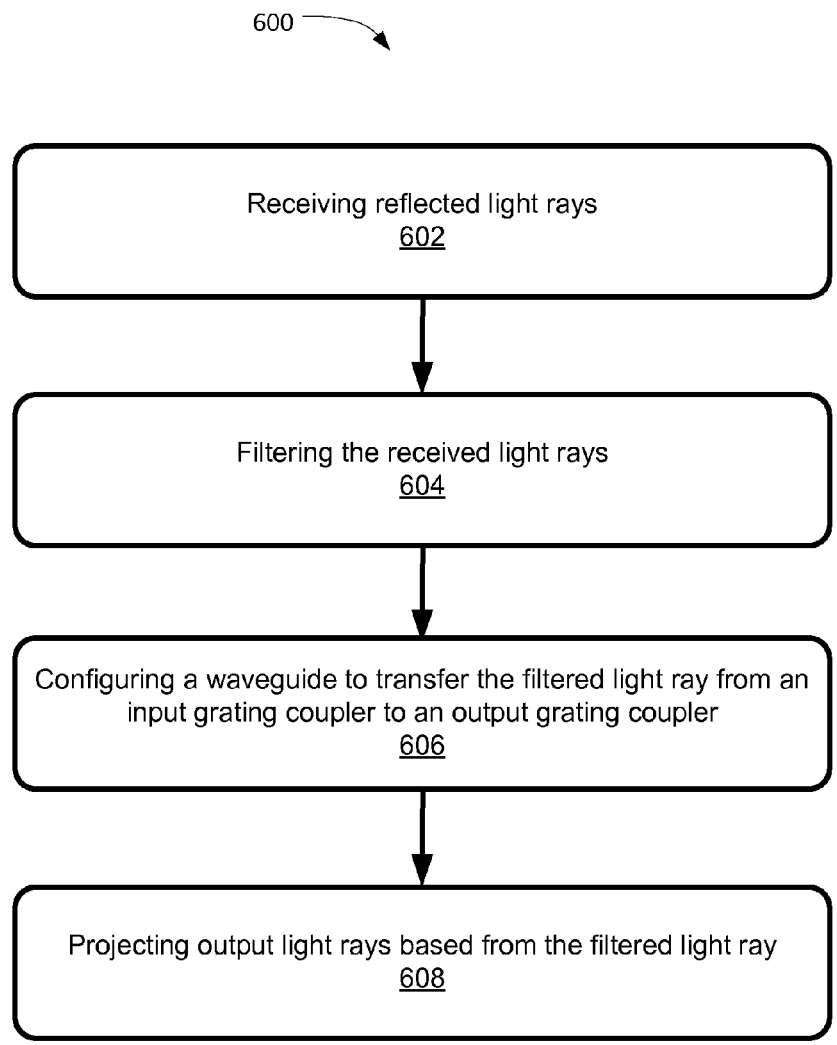
FIG. 6 illustrates an example flowchart of an example method of implementing a passive cloaking device with embedded microwaves.

FIG. 6 shows an example process flowchart 600 illustrating an example method of implementing a passive cloaking device with embedded optical waves/photons. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 602, receiving reflected light rays is performed. For example, an object (e.g., tree 108) reflects light rays (e.g., light rays 302) that may be received by an input grating coupler (e.g., input grating coupler 304).

At block 604, filtering the received light rays to create a filtered light ray is performed. For example, an opening (e.g., opening 316) of the input grating coupler 304 is configured to filter the received light rays 302. In this example, the opening 316 provides a filtered light ray (e.g., filtered light ray 310) with an incident angle that produces a total internal reflection in a waveguide (e.g., waveguide 306). The total internal reflection is created due to a cladding material (e.g., cladding material 308) that envelopes the waveguide 306. For example, the cladding material 308 contains a lesser refractive index as compared to the waveguide 306. In this example, the difference in the refractive index coupled with the configured opening 316 at the input grating coupler 304 may provide the total internal reflection.

At block 606 configuring the waveguide to transfer the filtered light ray from the input grating coupler to output grating coupler is performed. For example, the filtered light ray is reflected with minimum losses from the input grating coupler 304 to the waveguide 306. In this example, the dimensions of the waveguide 306 are configured to provide the total internal reflection in order to contain the filtered light ray 310 within the waveguide 306. In other words, the dimensions of the waveguide 306 (e.g., forty by forty microns) are configured to avoid refraction of the filtered light ray 310 to the cladding material 308.

At block 608, projecting output light rays based from the filtered light ray is performed. For example, the filtered light ray 310 is directed all the way from the input grating coupler 304 to an output grating coupler (e.g., output grating coupler 312). In this example, another opening (e.g., opening 318-4) of the output grating coupler 312 is configured to provide an output light ray (e.g., output light ray 314) based from the filtered light ray 310. In other words, the output light rays 314 project an image representation of the received light rays 302 at the input grating coupler 304.

In an implementation, construction configuration of the input grating coupler 304 is exactly in an opposite direction as against the output grating coupler 312. For example, the input grating coupler 304 is receiving the light rays 302 at right side (e.g., right side 110) while the output grating coupler 312 is facing the direction of a viewer (e.g., human eye 102) at the other side (e.g., left side 104). In this example, the input grating coupler 304 and the output grating coupler 312 are concentric with one another.

Furthermore, multiple sets of image projector systems (e.g., image projector 300) that contain the input grating coupler 304, waveguides 306, and the output grating are configured to project whole image of the tree 108. For example, a cloaking device (e.g., cloaking device 112) is made up of multiple input grating couplers 304 to receive the light rays 302 at the right side 110 and project the light rays 302 to the left side 104 to provide resemblance of the whole image of the tree 108.

Figure 7:
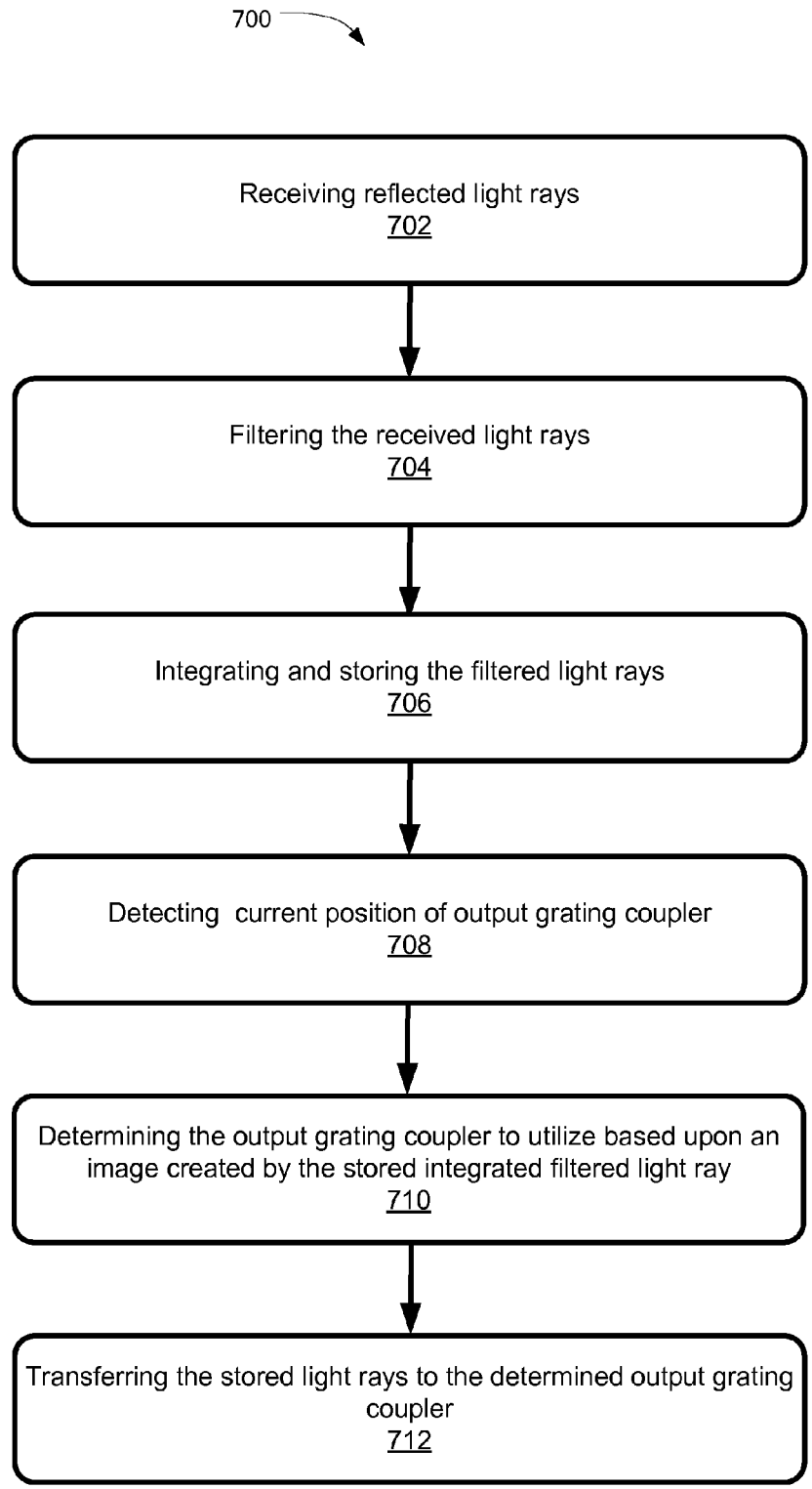
FIG. 7 illustrates an example flowchart of an example method of implementing an active cloaking device suit with embedded microwaves.

FIG. 7 shows an example process flowchart 700 illustrating an example method of implementing an active cloaking device suit with embedded optical waves/photons. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 702, receiving reflected light rays is performed. For example, an object (e.g., bushes 208) reflects light rays (e.g., light rays 302) that may be received by the input grating coupler 304.

At block 704, filtering the received light rays to create a filtered light ray is performed. For example, an opening (e.g., opening 316) of the input grating coupler 304 is configured to filter the received light rays 302 (that are reflected by the bushes 208). In this example, the opening 316 provides a filtered light ray (e.g., filtered light ray 310) with an incident angle that produces a total internal reflection in a waveguide (e.g., waveguide 306). The total internal reflection is created due to a cladding material (e.g., cladding material 308) that envelopes the waveguide 306. For example, the cladding material 308 contains a lesser refractive index as compared to the waveguide 306. In this example, the difference in the refractive index in addition to the configuration of the opening 316 at the input grating coupler 304 may provide the total internal reflection.

At block 706, integrating and storing the filtered light rays is performed. For example, an SOC microcontroller (e.g., SOC microcontroller 502) is configured to integrate all of the filtered light rays 310 at a particular time instant before storing the integrated filtered light rays 310 to a memory. In this example, the integrated filtered light rays 310 may themselves provide a projected image of the filtered light rays 310 at the particular time instant. Furthermore, the SOC microcontroller is configured to detect a particular input grating coupler source of a particular filtered light ray 310.

At block 708, detecting current position of output grating couplers at opposite sides of the cloaking device suit is performed. For example, the SOC microcontroller is configured to determine the current crease (i.e., current fold) of the cloaking device suit 206 by detecting bending and twisting of the cloaking device suit 206 through a crease detector (e.g., crease detector 504). In this example, the crease detector 504 is utilized to detect a current posture (e.g., kneeling position, sitting position, etc.) of a user (e.g., hunter 202). Furthermore, the crease detector 504 is utilized to determine current position of the output grating couplers 312 and relays this information to the SOC microcontroller 502.

At block 710 transferring the stored light rays 310 to the output grating coupler is performed. For example, after determining the output grating couplers 312 to utilize in projecting the image created by the stored integrated filtered light rays 310, the SOC microcontroller 502 is configured to direct an image integrator and projector component (e.g., image integrator and projector 506) to transfer the stored integrated filtered light rays 310 to the determined output grating couplers 312.

What is claimed is:

1. A cloaking device comprising:
   an input grating coupler that is configured to receive and filter light rays, the input grating coupler is located at one side of the cloaking device;
   a waveguide coupled to the input grating coupler, the waveguide is configured as a fabric that is wrapped around and ends at opposite side of the cloaking device, wherein the waveguide is configured to direct the filtered light rays;
   an output grating coupler coupled to the waveguide at the opposite side of the cloaking device, the output grating coupler is configured to be concentric with the input grating coupler, the output grating coupler is configured to provide output light rays; and
   a crease detector that is configured to detect current position of an output grating coupler.

2. The cloaking device as recited in claim 1, wherein the cloaking device is a passive cloaking device that is utilized to blanket an object, wherein an image behind the passive cloaking device reflects the light rays and the output light rays reproduce the image in front of the cloaking device.

3. The cloaking device as recited in claim 1, wherein the input grating coupler is configured to include an opening that filters the light rays, the opening is configured to create total internal reflection of the filtered light ray.

4. The cloaking device as recited in claim 1, wherein the waveguide is wrapped with a cladding material that includes a lesser refractive index, wherein a boundary between the waveguide and the cladding material reflects the filtered light rays within the waveguide that includes a higher refractive index.

5. The cloaking device as recited in claim 1, wherein the output grating coupler is configured to include an opening to provide the output light rays.

6. The cloaking device as recited in claim 1, wherein the waveguide is bidirectional.

7. Clothing comprising the cloaking device as recited in claim 1.

8. The cloaking device system as recited in claim 1, wherein the crease detector is further configured to determine whether the fabric of the waveguide is bent or twisted.

9. A cloaking device system comprising:
   an input grating coupler that is configured to receive and filter light rays;
   a cloaking device integrator coupled to the input grating coupler, the cloaking device integrator comprising:
      an image integrator and projector that receives and integrates the filtered light rays;
      a memory that is configured to store the integrated filtered light rays;
      a crease detector that is configured to detect current position of an output grating coupler;
      a system on chip (SOC) microprocessor unit that is configured to determine which output grating coupler to utilize based upon the detected current position, wherein the image integrator and projector transfers the stored integrated filtered light rays to the determined output grating coupler;
   the output grating coupler coupled to the cloaking device integrator, the output grating coupler is configured to provide output light rays.

10. The cloaking device system as recited in claim 9, wherein the input grating couplers are located at one side of a cloaking device while the output grating couplers are located at opposite side of the cloaking device, or vice-versa.

11. The cloaking device system as recited in claim 9, wherein the output grating coupler includes an opening that is configured to provide the output light rays.

12. The cloaking device system as recited in claim 9, wherein the SOC microcontroller is configured to determine which output grating coupler to utilize based upon an image created by the stored integrated filtered light rays.

13. The cloaking device system as recited in claim 9 further comprising a waveguide to couple the input grating coupler to the cloaking device integrator, and a second waveguide that couples the cloaking device integrator to the output grating coupler.

14. The cloaking device system of claim 13 wherein the waveguides are bidirectional.

15. The cloaking device system as recited in claim 9 further comprising a cladding material that includes a lesser refractive index, wherein a boundary between a waveguide and the cladding material reflects the filtered light rays within the waveguide that includes a higher refractive index.

16. The cloaking device system as recited in claim 9, wherein the input grating coupler is configured to include an opening that filters the light rays, the opening is configured to create total internal reflection of the filtered light ray.

17. The cloaking device system as recited in claim 9, wherein the crease detector is further configured to determine whether the fabric of the waveguide is bent or twisted.

* * * * *